W. L. MANN.
SPRING WHEEL.
APPLICATION FILED MAY 3, 1911.
1,075,838.
Patented Oct. 14, 1913.
2 SHEETS—SHEET 2.
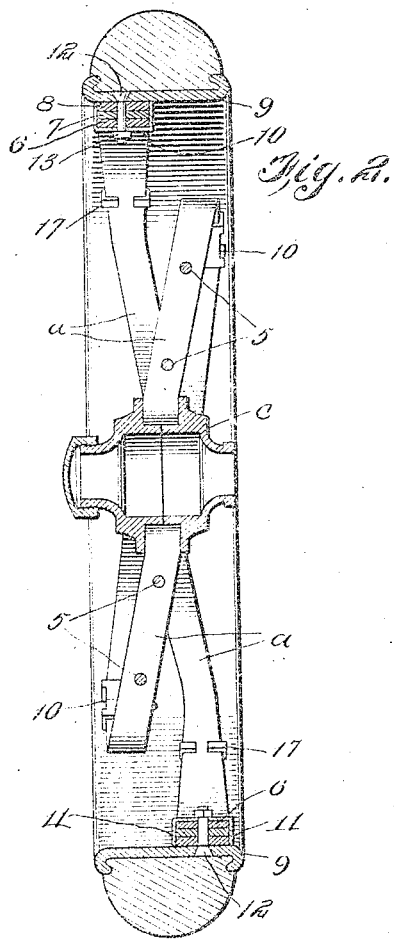
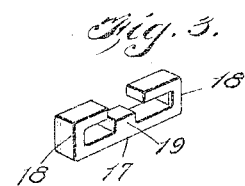
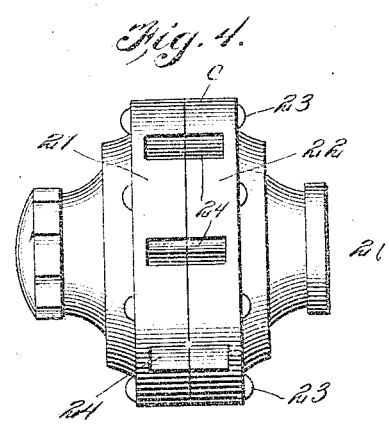
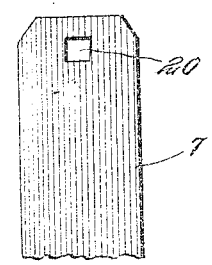
Inventor
William L. Mann
Witnesses
Louis R. Heinrichs
John A. Donegan
By Victor J. Evans
Attorney

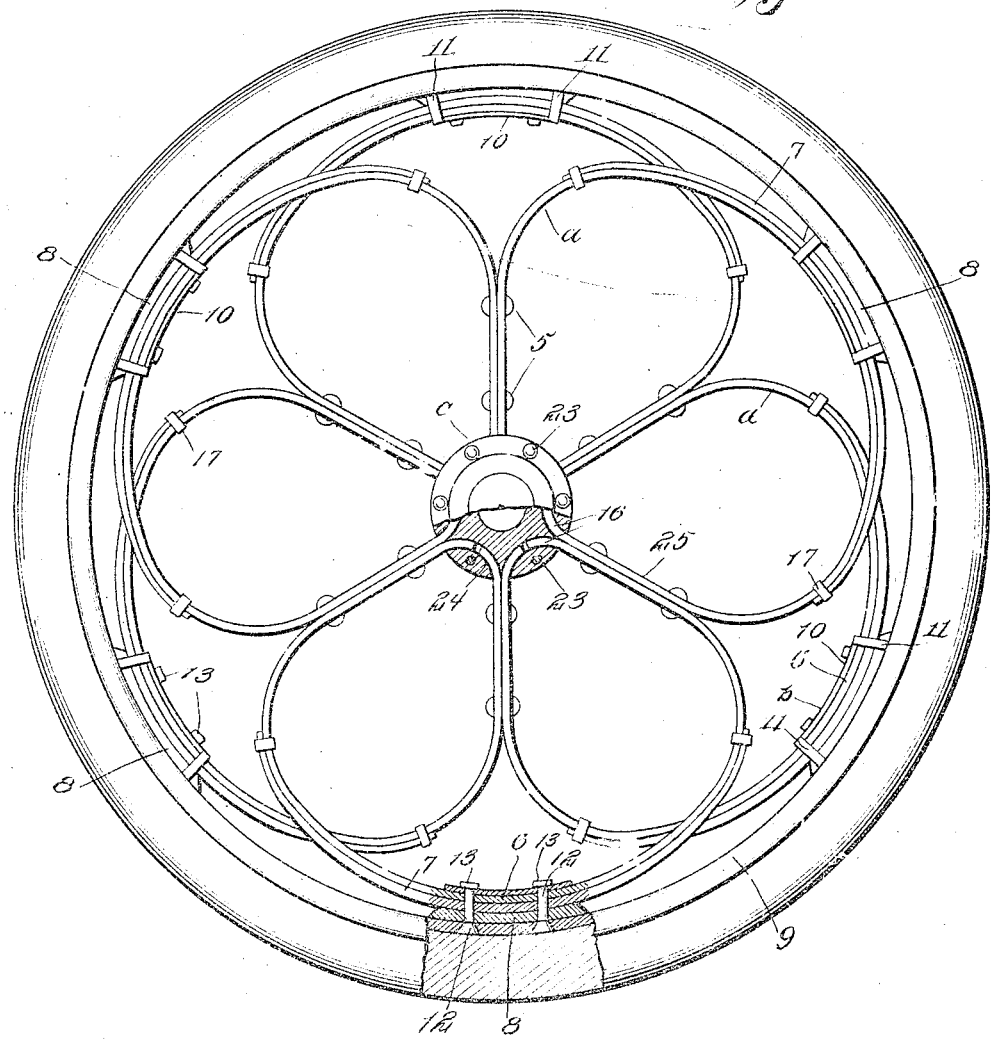

UNITED STATES PATENT OFFICE.

WILLIAM L. MANN, OF ST. JOSEPH, MISSOURI.

SPRING-WHEEL.

1,075,838. Specification of Letters Patent. Patented Oct. 14, 1913.

Application filed May 3, 1911. Serial No. 624,756.

*To all whom it may concern:*

Be it known that I, WILLIAM L. MANN, citizen of the United States, residing at St. Joseph, in the county of Buchanan and State of Missouri, have invented new and useful Improvements in Spring-Wheels, of which the following is a specification.

The object of the invention is to increase the strength and durability of spring wheels without decreasing the yielding properties thereof.

The above and other objects will appear and be better understood from the following description taken in connection with the accompanying drawings in which—

Figure 1 is a side elevation of the device partly in section; Fig. 2 is a vertical sectional view; Fig. 3 is a detail perspective of the clip for securing the auxiliary or leaf spring to the loop spring; Fig. 4 is a detail side view of the hub; Fig. 5 is a fragment of one end portion of the auxiliary or leaf spring.

In lieu of the spokes of the ordinary rigid wheel I provide a plurality of overlapping spring loops *a* alternately secured together in any preferred manner such as by rivets 5. Each loop is formed preferably, though not necessarily, of a single piece of suitable metal the intermediate portion 6 of which bears on a leaf spring the latter bearing on a bolster 8 on the inner surface of the rim 9 of the wheel, the parts being secured by means of a clip *b*. The clip *b* comprises a curved plate 10 which bears on the central portion of the inner surface of the part 6 and has arms 11 which bear on the sides of the parts 6, 7 and 8. The arms 11 coöperate with the bolts 12 to prevent lateral displacement of the parts. The bolts 12 pass through openings in the parts 6, 7 and 8 and also through openings in the rim 9 and in addition to preventing lateral displacement of the parts 6, 7 and 8 serve to connect these parts to the rim 9, the bolts being secured by suitable nuts 13.

The portion 6 of each spring and each leaf spring are curved on the arc of a circle, the end portion of the leaf spring being secured to the portion 6 by means of clips 17 which extend transversely of the leaf spring and have angular shaped end portions 18 which extend over the sides and bear on the inner face of the portion 6. Each clip is further provided with a pin 19 which extends through an opening 20 in the end portion of the leaf spring on which it bears. The hub *c* comprises opposed sections 21 and 22 secured together in any preferred manner such as by bolts 23. A plurality of grooves or recesses 24 are formed in the inner faces of the sections of the hub, the opposite ends of each groove or recess extending through the periphery of the hub and communicating with the adjacent grooves. The curved end portions of each spring are inserted into the remote ends of adjacent grooves or recesses as shown, the straight portions 25 of alternate springs being secured together by rivets as before described. As shown in Fig. 2 the curved portions 6 of the spring are off set and arranged in staggered relation and secured to the inner surface of the rim as before described. I have shown the rim 9 as being channeled and provided with a rubber tire as shown. It is to be understood however, that this specific form of tire and rim may be dispensed with if desired and a metallic tire with the usual rim employed instead.

By shaping the springs *a* as shown a high degree of resiliency is obtained and the provision of the leaf springs permits the use of lighter material for the springs *a*. It will be seen that a comparatively small portion of each of the springs *a* namely that portion between the ends of the leaf spring and rivets is not reinforced. These parts will, of course, show the greatest strain during use but by virtue of their comparatively short lengths, excessive yielding, will be prevented and by virtue of the staggered relation of the springs the wheel as a whole will be materially strengthened.

What is claimed as new is:

A spring wheel including a rim, a hub formed with a plurality of curved recesses opening through the surface of the hub, immediately adjacent recesses having a common entrance opening, and a plurality of spring loops, said loops having their terminals inserted in and extending partly through adjacent recesses, the respective terminals entering the respective recesses from opposite directions, the sections of the adjacent loops being secured together beyond the hub, said connected sections entering the common entrance of the immediately adjacent recesses, and means for securing the loops to the rim whereby pressure upon any particular loop is through the recess formation resisted by the tension of the adjacent loop.

In testimony whereof I affix my signature in presence of two witnesses.

WILLIAM L. MANN.

Witnesses:
 OSCAR A. BANDEL,
 CLUFF B. MANN.